United States Patent
Liu et al.

(10) Patent No.: US 10,393,628 B2
(45) Date of Patent: Aug. 27, 2019

(54) TRACK VEHICLE COLLISION TESTING DEVICE AND TRACK VEHICLE COLLISION TESTING METHOD

(71) Applicant: CRRC QINGDAO SIFANG CO., LTD., Qingdao, Shandong (CN)

(72) Inventors: Zhixiang Liu, Shandong (CN); Wanjing Wang, Shandong (CN); Zhiqiang Zhang, Shandong (CN); Yiping Chen, Shandong (CN); Weihua Wang, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 263 days.

(21) Appl. No.: 15/325,062

(22) PCT Filed: Oct. 27, 2015

(86) PCT No.: PCT/CN2015/092904
§ 371 (c)(1),
(2) Date: Jan. 9, 2017

(87) PCT Pub. No.: WO2016/074562
PCT Pub. Date: May 19, 2016

(65) Prior Publication Data
US 2017/0184473 A1    Jun. 29, 2017

(30) Foreign Application Priority Data
Nov. 10, 2014   (CN) .......................... 2014 1 0629472

(51) Int. Cl.
G01M 17/08       (2006.01)
G01M 17/007      (2006.01)

(52) U.S. Cl.
CPC ........ G01M 17/08 (2013.01); G01M 17/0078 (2013.01)

(58) Field of Classification Search
CPC .......................... G01M 17/08; G01M 17/0078
(Continued)

(56) References Cited

U.S. PATENT DOCUMENTS

| | | | |
|---|---|---|---|
| 5,483,845 A | 1/1996 | Stein et al. | |
| 2012/0186369 A1* | 7/2012 | Matlschweiger | G01M 7/08 73/865.3 |
| 2016/0054199 A1 | 2/2016 | Fritz et al. | |

FOREIGN PATENT DOCUMENTS

| CN | 1361030 A | 7/2002 |
|---|---|---|
| CN | 2528658 Y | 1/2003 |

(Continued)

*Primary Examiner* — John Fitzgerald
*Assistant Examiner* — Rodney T Frank
(74) *Attorney, Agent, or Firm* — Apex Attorneys at Law, LLP; Yue (Robert) Xu

(57) ABSTRACT

A rail vehicle collision test rig used for a collision test on a tested vehicle is provided, and includes: a track configured to support and guide the tested vehicle; a small vehicle configured to push the tested vehicle; a drive motor configured to drive the small vehicle to advance and arranged at a first end of the track; a first rotating hub arranged at the first end of the track and connected to the drive motor; a brake motor configured to brake the small vehicle; a second rotating hub arranged at the second end of the track and connected to the brake motor; a connecting rope wound on the first rotating hub and the second rotating hub; a detector configured to detect a velocity and a position of the tested vehicle; and a controller connected to the detector and is allowed to be in communication with the detector.

12 Claims, 1 Drawing Sheet

(58) Field of Classification Search
USPC .......................................................... 73/12.04
See application file for complete search history.

(56) References Cited

FOREIGN PATENT DOCUMENTS

| | | | |
|---|---|---|---|
| CN | 2769876 | Y | 4/2006 |
| CN | 101430251 | A | 5/2009 |
| CN | 201909716 | U | 7/2011 |
| CN | 202183175 | U | 4/2012 |
| CN | 103954421 | A | 7/2014 |
| CN | 104359642 | A | 2/2015 |
| DE | 102013214936 | A1 | 9/2014 |
| JP | S59214729 | A | 12/1984 |
| KR | 0142499 | B1 | 7/1998 |
| WO | 2004/046677 | A1 | 6/2004 |
| WO | 2005010478 | A1 | 2/2005 |

\* cited by examiner

TRACK VEHICLE COLLISION TESTING DEVICE AND TRACK VEHICLE COLLISION TESTING METHOD

This application is the national phase of International Application No. PCT/CN2015/092904, titled "TRACK VEHICLE COLLISION TESTING DEVICE AND TRACK VEHICLE COLLISION TESTING METHOD", filed on Oct. 27, 2015, which claims the benefit of priority to Chinese patent application No. 201410629472.3, titled "RAIL VEHICLE COLLISION TEST RIG AND RAIL VEHICLE COLLISION TEST METHOD", filed with the Chinese State Intellectual Property Office on Nov. 10, 2014, the entire disclosures of which applications are incorporated herein by reference.

TECHNICAL FIELD

This application relates to the technical field of track transport vehicle collision test, and particularly to a rail vehicle collision test rig and a rail vehicle collision test method.

BACKGROUND

With the rapid development of track transport industry in China since 21st century, manufacturing techniques of rail vehicles including trains and subways are constantly improved. In the test methods based on performance requirement aspects such as security, the most efficient and actual test method is a collision test performed on a real rail vehicle.

In recent years, in real vehicle collision tests performed on real rail vehicles for the purpose of obtaining various real data, higher and higher requirements are imposed on accuracy in controlling the velocity of a tested vehicle. Therefore, the improvement of accuracy of velocity in the process of the rail vehicle collision test has become a design goal.

In a conventional rail vehicle collision test, a tested vehicle is driven to accelerate on a fixedly set up track by a real automatic locomotive as a drive device, for example, the tested vehicle is pushed from the rear of the tested vehicle by a locomotive to accelerate. With the locomotive gradually accelerated, when the tested vehicle pushed by the locomotive reaches a preset velocity required by the collision test, accelerating of the locomotive is stopped, and the locomotive is braked. The tested vehicle, in a state of losing a pushing force from the rear locomotive, slides forward on the track, and further collides with a test rig, thus the test rig can acquire related data including car body depression and distortion attitudes and a collision force, etc. In such a test process, a real locomotive serves as a power source to drive, and since the locomotive is required to be manually operated, an operator operates the locomotive after receiving information such as the velocity, therefore the operation has a lag. Further, the designed function of the locomotive is to drag a carriage or a wagon to travel normally, therefore, the locomotive has a low sensitivity in responding to a system operating to accelerate, decelerate or brake, sensitive response cannot be made at important time and velocity nodes during the processes of accelerating and braking, and accurate switch control cannot be achieved in a transitory control window period. Therefore, the rail vehicle collision test performed by taking a real rail vehicle including a locomotive as a power source in the conventional technology has a low accuracy in velocity control, and further test data cannot be precisely obtained.

In the above conventional technology, the technical issue to be addressed presently by those skilled in the art is the low accuracy of velocity control to a tested vehicle during a rail vehicle collision test.

SUMMARY

An object of the present application is to provide a rail vehicle collision test rig and a rail vehicle collision test method. With the use of the present application, the accuracy of velocity control to a tested vehicle in a rail vehicle collision test is significantly improved.

To address the above technical issues, a rail vehicle collision test rig is provided according to the present application, which is used for a collision test on a tested vehicle, and includes:

a track configured to support and guide the tested vehicle;

a small vehicle configured to push the tested vehicle, wherein the small vehicle is arranged on the track;

a drive motor configured to drive the small vehicle to move forward, wherein the drive motor is arranged at a first end of the track;

a first rotating hub, wherein the first rotating hub is arranged at the first end of the track and is connected to the drive motor;

a brake motor configured to brake the small vehicle, wherein the brake motor is arranged at a second end of the track;

a second rotating hub, wherein the second rotating hub is arranged at the second end of the track and is connected to the brake motor;

a connecting rope, wherein the connecting rope is wound on the first rotating hub and the second rotating hub, and the small vehicle is connected to the connecting rope at a portion between the first rotating hub and the second rotating hub;

a detector configured to detect a velocity and a position of the tested vehicle in real time; and a controller, which is connected to the detector and allowed to communicate with the detector, and is configured to control the drive motor and the brake motor to operate or stop operating.

Preferably, the rail vehicle collision test rig further includes a fixed seat fixed to the tested vehicle, the fixed seat is provided with a locking pin hole; a base fixed to the small vehicle, a locking pin which is embeddable into or disengageable from the locking pin hole and a locking pin motor configured to drive the locking pin are provided on the base.

Preferably, the track includes an accelerating section, an accelerating start end of the accelerating section is higher than an accelerating terminal end of the accelerating section.

Preferably, taking the accelerating terminal end as a base point, an upward inclination angle of the accelerating section in a horizontal direction ranges from 10 degrees to 30 degrees.

Preferably, the rail vehicle collision test rig further includes a protection stopper configured to limit the movements of the tested vehicle, and the protection stopper is arranged at the accelerating start end.

Preferably, the track includes a sliding section, a sliding start end of the sliding section is coincident with the accelerating terminal end, and the sliding start end is higher than a sliding terminal end of the sliding section.

Preferably, taking the sliding terminal end as a base point, an upward inclination angle of the sliding section in a horizontal direction ranges from 2 degrees to 10 degrees.

Preferably, the rail vehicle collision test rig further includes a brake mechanism configured to stop the rotation of the brake motor, and the brake mechanism is arranged at a lateral side of the brake motor.

A rail vehicle collision test method is further provided according to the present application, which includes:

step 10: arranging a tested vehicle and a small vehicle to locate at a test starting position on a track, and
adjusting the small vehicle to locate at the rear of the tested vehicle and in contact with the tested vehicle and abut against the tested vehicle;

step 20, starting a drive motor to drive the small vehicle to perform an accelerated movement, and
pushing the tested vehicle by the small vehicle to perform an accelerated movement;

step 30, detecting a velocity of the tested vehicle, and immediately entering step 40 when velocity of the tested vehicle reaches a preset velocity; and step 40, stopping the drive motor, and meanwhile starting a brake motor to brake the small vehicle.

Preferably, after step 20 and before step 40, the rail vehicle collision test method further includes:

step 100, determining whether the real time state of present test is normal, entering step 110 if it is determined that the real time state of present test is normal, and
entering step 120 if it is determined that the real time state of the present test is abnormal;

step 110, disconnecting the small vehicle from the tested vehicle by separating of the controlled separating device, and entering step 40; and step 120, maintaining the small vehicle to be in connection with the tested vehicle by the controlled separating device, and entering step 40.

The track is configured to support and guide the tested vehicle and the small vehicle. The small vehicle, as a device which actually pushes the tested device, is required to abut against the tested vehicle in the process of driving the tested vehicle to accelerate in the practical test working. The drive motor and the first rotating hub are arranged at one end of the track, and the first rotating hub is connected to the drive motor and is rotated along with the rotation of the drive motor. At another end of the track, the brake motor and the second rotating hub are arranged. The second rotating hub is connected to the brake motor and is rotated along with the rotation of the brake motor. The connecting rope is wound on both the first rotating hub and the second rotating hub, and moves synchronously along with the rotation of the first rotating hub and the second rotating hub. This connection structure of the connecting rope determines that the connecting rope extends from the first end of the track to the second end of the track. In the state that the connecting rope is close to the track and in parallel with the track, at a position where the connecting rope meets the small vehicle on the track, the connecting rope is connected to the small vehicle, and a connection position point is synchronous with the movement of the small vehicle. That is, the moving of the connecting rope along the track can drive the small vehicle to slide on the track. In the case that the connecting rope is connected to both the first rotating hub and the second rotating hub and the connecting rope itself is a looped structure connected end-to-end, the first end of the track where the drive motor and the first rotating hub are located may be a moving start end of the rail vehicle or a moving terminal end of the rail vehicle in process of the rail vehicle collision test. In the case that the connecting rope has one end wound on the first rotating hub and has another end wound on the second rotating hub and the connecting rope itself is in a non-looped straight state, the first end of the track where the drive motor and the first rotating hub are located must be the terminal end of the movement of the tested vehicle in the collision test, i.e., a position where the tested vehicle moves towards. The drive motor achieves pulling the tested vehicle to move to the terminal end by the first rotating hub, the connecting rope, and the small vehicle. Correspondingly, the second end of the track where the brake motor and the second rotating hub are located must be the moving start end of the tested vehicle in the collision test, that is, a position where the tested vehicle moves away, and the brake motor achieves retaining of the small vehicle to prevent the small vehicle from moving forward by the second rotating hub and the connecting rope.

In the state that the detector detects the velocity of the tested vehicle in real time, and when the velocity value detected reaches a preset test requirement, the drive motor is controlled by the controller to stop operating, and meanwhile the brake motor is controlled to operate. In a practical working condition, when the drive motor rotates, the first rotating hub is rotated along with the rotation of the drive motor, the first rotating hub drives the connecting rope to move, and the connecting rope, while driving the small vehicle to move, further drives the second rotating hub and the brake motor to rotate in a follow-up manner. When it is detected by the detector that the small vehicle pushed the tested vehicle p to accelerate to the preset velocity, a controller controls the drive motor to stop operating, at this time, the drive motor, the first rotating hub, the connecting rope, the small vehicle, and the second rotating hub and the brake motor cannot be completely still due to the presence of inertia. When the brake motor is started to operate, in a short time, the direction of inertial motion of the overall system is opposite to an operation direction of the brake motor, and a resistance generated by the operation of the brake motor overcomes the inertial motion in the system in a short time, thus making the system be still.

With the above structural arrangement, compared with manually operating a real locomotive to drive in the conventional technology which brings the drawbacks of a low accuracy of velocity control, the rail vehicle collision test rig according to the present application can precisely control the accelerating process of the tested vehicle, which significantly improves the accuracy of the velocity control.

In addition, the space occupied by the devices provided in the present application is small, compared with the real locomotive applied in the conventional technology, the space required by the test work is saved according to the present application.

In a preferred embodiment about the rail vehicle collision test method, in the process of increasing the velocity of the tested vehicle, a drive force is provided by the drive motor. When it is detected that the velocity of the tested vehicle reaches an expected value, the drive motor is controlled to stop operating, meanwhile, the brake motor is started. Under the effect of inertial, it is difficult to stop the shift timely, and the operation of the brake motor generates a reverse action force which overcomes an inertial movement rapidly, to achieve an effect of rapidly decelerating and braking. In the conventional technology, a real locomotive is manually operated to drive and accelerate, and when it is detected that the tested vehicle reaches a preset velocity, a tester receives the information, and further manually operates to brake the locomotive, this manual process has lag, and also the sensitivity of the locomotive system cannot meet the high sensitivity requirement of the test, and is not comparable with the sensitivity of the rotation of the motor. Compared with the conventional technology, the test method according to the present application significantly improves the accuracy of velocity control to the tested vehicle during the test.

BRIEF DESCRIPTION OF THE DRAWINGS

For more clearly illustrating embodiments of the present application or technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

Figure 1:
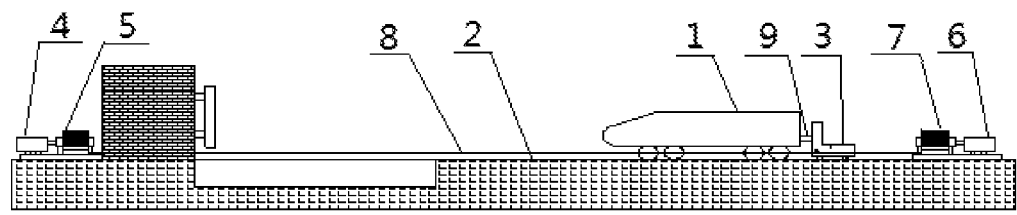
FIG. 1 is a an overall schematic view showing the structure of the present application.
Figure 2:
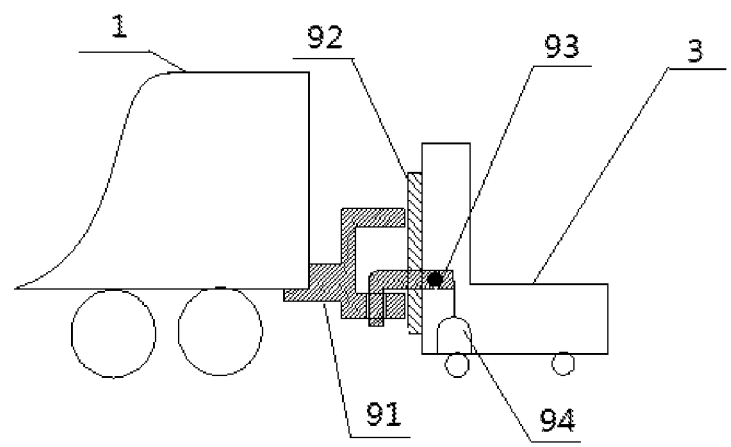
FIG. 2 is a schematic view showing the structure of a controlled separating device.

Reference numeral in FIGS. 1 and 2:

| 1 tested vehicle, | 2 track, |
| 3 small vehicle, | 4 drive motor, |
| 5 first rotating hub, | 6 brake motor, |
| 7 second rotating hub, | 8 connecting rope, |
| 9 controlled separating device, | 91 fixed seat, |
| 92 base, | 93 locking pin, and |
| 94 locking pin motor. | |

DETAILED DESCRIPTION

An aspect of the present application is to provide a rail vehicle collision test rig and a rail vehicle collision test method. With the using of the present application, the accuracy in controlling a velocity of a tested vehicle in a rail vehicle collision test can be significantly improved.

The technical solutions of the embodiments of the present application will be clearly and completely described hereinafter in conjunction with the drawings of the embodiments of the present application. Apparently, the embodiments described are only some examples of the present application, rather than all implementations. Other embodiments obtained by those skilled in the art based on the embodiments of the present application without any creative efforts all fall into the protection scope of the present application.

Reference is made to FIGS. 1 and 2, the following embodiments are described with reference to FIGS. 1 and 2.

As illustrated, a tested vehicle 1 and a small vehicle 3 are both located at a test starting position on a track 2, and the small vehicle 3 is located at the rear of the tested vehicle 1 and abuts against the tested vehicle 1. Since the most immediate test state of the collision test is to collide with a front part of the tested vehicle 1, the small vehicle 3 configured to push the tested vehicle 1 to move forward may only be located at the rear of the tested vehicle 1. Here, an advancing direction of the tested vehicle 1 and the small vehicle 3 during the test is defined as the front direction. Correspondingly, in any two points on the track 2 in the advancing direction, one point close to the test terminal position is a terminal end, and the other point is a start end. Therefore, the so called terminal end and start end each are not a certain fixed point on the track 2, but a name having a property of comparison between relative positions, which does not constitute a limit to the protection scope defined by this solution. The drive motor 4 is connected to a first rotating hub 5, the first rotating hub 5 rotates along with the rotation of the drive motor 4, and the drive motor 4 and the first rotating hub 5 are arranged at a first end of the track 2.

A brake motor 6 is connected to a second rotating hub 7, the second rotating hub 7 rotates along with the rotation of the brake motor 6, and the brake motor 6 and the second rotating hub 7 are arranged at a second end of the track 2. Further, the brake motor 6 is provided with a brake mechanism. The first end and the second end of the track 2 respectively refer to a test starting position and a test terminal position on the track 2. Different portions of the connecting rope 8 are respectively wound on the first rotating hub 5 and the second rotating hub 7, i.e., the operation of the drive motor 4 or the brake motor 6 can consequentially drive the connecting rope 8 to translate in the direction of the track 2. As implied in the names, the drive motor 4 and the brake motor 6 have opposite functions, the respective rotating directions of the drive motor 4 and the brake motor 6 during operation are also opposite. In such a connection state, if the connecting rope 8 has a first end wound on the first rotating hub 5, and has a second end wound on the second rotating hub 7, just like a connecting rope in the form of "tug-of-war", the two ends of the connecting rope 8 are separated and are respectively located on two sides of the track 2. In this case, the drive motor 4 and the first rotating hub 5 are located at the first end of the track 2, and the first end must be the test terminal position of the track 2, only in this way, can the function of the drive motor 4 pulling the tested vehicle 1 and the small vehicle 3 on the track 2 forward be achieved. Correspondingly, the second end where the brake motor 6 and the second rotating hub 7 are located must be the test starting position on the track 2, only in this way, can the function of the brake motor 6 holding and stopping the tested vehicle 1 and the small vehicle 3 on the track 2 be achieved. It should be noted that, in the above structure, since the first rotating hub 5 and the second rotating hub 7 are respectively located at two ends of the track 2, the connecting rope 8 must be located near the trace of the track 2. At a portion of the connecting rope 8 close to the small vehicle 3 on the track 2, the connecting rope 8 and the small vehicle 3 are fixedly connected in a follow-up manner, i.e., the small vehicle 3 can be pulled to move by the movement of the connecting rope 8. Continuing the above description about the arrangement of the drive motor 4, the first rotating hub 5, the brake motor 6, and the second rotating hub 7, when the connecting rope 8 is a ring structure connected end-to-end, a local part of the connecting rope 8 is wound on the first rotating hub 5, and another local part thereof is wound on the second rotating hub 7. In this case, there are two parallel sections of the connecting rope 8 along a trace position of the track 2, that is, the structure consisting of the looped connecting rope 8, the first rotating hub 5 and the second rotating hub 7 is similar to a "tank caterpillar band". Unlike the above connecting rope 8 with the "tug-of-war" structure, in the connecting rope 8 has such a structure, the first end of the track 2 at which the drive motor 4 and the first rotating hub 5 are located may be the test terminal position, and may also be a test starting position. Correspondingly, the brake motor 6 and the second rotating hub 7 can be just arranged on the opposite side of the drive motor 4 and the first rotating hub 5.

The velocity of the tested vehicle 1 is detected in real time by a detector. When it is detected that the velocity of the tested vehicle 1 has been increased to a required velocity, the drive motor 4 is controlled to stop operating by a controller, and meanwhile, the brake motor 6 is controlled to start by the controller. Such a structural arrangement of reverse tractions by two motors is intended to accurately control the connecting rope 8. Since the connecting rope 8 has a non-rigid structure, if a single motor is used to drive, even if the single motor used is a stepper motor which can control its own rotation and stopping, the inertial movements of the rotating hubs and the connecting rope are unavoidable. With the arrangement of two motors in the present application, while the drive motor 4 stops operating, the operation of the brake motor 6 having a reverse action force functions to reversely hinder the inertial movement of the connecting rope 8, which prevents the inertial movements or rotation of the connecting rope 8, the first rotating hub 5 and the second rotating hub 7 to a maximum degree, thus precisely controlling the moving velocity and stopping of the small vehicle 3.

In the conventional technology, the functions of driving and accelerating the tested vehicle are achieved by a real running locomotive, the velocity control of the real running locomotive has a low response sensitivity, and cannot meet the requirement of velocity control of "laboratory level". Also, since the locomotive is operated by an operator to stop after the operator receives a velocity detection signal, lag due to human factors exists. Unlike the conventional technology, in the present application, the accelerating operation of the tested vehicle is performed by a system including the drive motor, the brake motor, the detector, and the controller, thus the accuracy in velocity control of the tested vehicle in the rail vehicle collision test is improved.

In addition, the application of this system, compared with the real locomotive as the drive device in the conventional technology, saves the space occupied by the test, and shortens a distance of the track 2 required.

In another embodiment, in a structural state that the small vehicle 3 is located at the rear of the tested vehicle 1, and is in contact with and abuts against the tested vehicle 1 in the above embodiments, a controlled separating device 9 is additionally provided. A fixed seat 91 in the controlled separating device 9 is fixedly arranged on the tested vehicle 1, and the fixed seat 91 is provided with a locking pin hole. A base 92 is fixedly arranged on the small vehicle 3. A locking pin 93 and a locking pin motor 94 configured to drive the locking pin 93 to act are provided on the base 92. Before the test starts, the small vehicle 3 is located at the rear of the tested vehicle 1 and is connected to the tested vehicle 1 by the controlled separating device 9, at this time, the locking pin 93 is embedded into the locking pin hole. After the test starts, in the process of the small vehicle 3 driving the tested vehicle 1 to have an acceleration movement, the locking pin motor 94 can be controlled to drive the locking pin 93 to act and further disengage from the locking pin hole. At this time, the fixed seat 91 is still fixed to the tested vehicle 1, while the base 92, the locking pin 93 and the locking pin motor 94 move along with the small vehicle 3, thus achieving the release of the connection between the small vehicle 3 and the tested vehicle 1. Such a structural arrangement can control the small vehicle 3 to stop at an initial stage of the test when the test is cancelled for some reasons, and the tested vehicle 1 not disconnected from the small vehicle 3 is also stopped. In this way, the test process can be controlled, and the collision of the tested vehicle 1 can be avoided in the case that an unknown interference factor occurs in the process of test, thus a considerable test expense can be saved. In the case that the accelerating process at the initial stage of the test is smooth without mistakes, and when it is at a time point that the tested vehicle 1 reaches a preset velocity, the locking pin motor 94 is controlled to operate, and the locking pin 93 is disengaged from the locking pin hole, thus achieving the disconnection of the small vehicle 3 from the tested vehicle 1, and further achieving the collision test.

In another embodiment, an accelerating section is divided from the track 2. The accelerating section is not a separate section of track 2, but a part of area of the track 2. The accelerating section area is located at the test starting position, i.e., an area in which the tested vehicle 1 is pushed to accelerate by the small vehicle 3 from resting state. Positions at two ends of the accelerating section are named as an accelerating start end and an accelerating terminal end, and the two ends are also not specific certain points, but relative position points, which have accordant description manner with the terminal end and start end described above. The accelerating start end is higher than the accelerating terminal end, the apparent effect is bringing beneficial effects to the accelerating of the tested vehicle 1, thereby allowing the acceleration of the tested vehicle 1 to be increased by a component generated by a gravity of the tested vehicle 1 when a drive force keeps constant. Such an arrangement not only saves the energy sources, but also shortens a length of, the track 2 required for the accelerating process, and saves the space.

Further, the accelerating section is arranged to have a slope between 10 degrees to 30 degrees.

Further, when the tested vehicle 1 is arranged on the sloping track 2 to be tested, a protection stopper is provided at a roller position of the tested vehicle. The protection stopper ensures that the tested vehicle 1 can be restricted from moving before a test preparation work is finished, which improves security. The protection stopper is arranged at the roller position on the track 2, and a position of the protection stopper in this case is just the accelerating start end. If the protection stopper is not provided, holding of the small vehicle 3 and the tested vehicle 1 can only be achieved by the connecting rope 8, the brake motor 6 and a brake mechanism included in the brake motor 6.

In another embodiment, a sliding section with a slope is provided at a section close to the test terminal end. In a second half of the test process, i.e., after the velocity of the tested vehicle 1 is increased to an expected value, the small vehicle 3 stops pushing the tested vehicle 1 to accelerate, and the tested vehicle 1 may slide through a section of the track 2, further performing the collision. In this embodiment, the sliding section originally exiting is designed to have the slope, and meanings of names of so called sliding section start and the sliding section terminal are described similar to the principle of the terminal end and the start end hereinbefore. The sliding start end here is coincident with the accelerating terminal end hereinbefore. That is, from principle, the tested vehicle 1 consequentially enters a sliding stage after the accelerating stage. However, during a practical test process, it is possible to have such a situation that, after passing the accelerating terminal end on the track 2, that is, passing the sliding start end, the tested vehicle 1 still has not reached a required velocity, and in this case, the small vehicle 3 continues to push the tested vehicle 1 to accelerate. Such a situation is not paradoxical with the division of the track 2 into the accelerating section and the sliding section in this specification, and the accelerating process performed on the sliding section may not obtain the gravity component generated from the slope of the accelerating section of the track 2. Continuing to describe the sliding section, the sliding section in this embodiment also has a certain slope, however, in theory, the slope of the sliding section is different from the slope of the accelerating section. The slope of the sliding section is relatively small, and has a function to guarantee that the velocity of the tested vehicle 1 is not reduced in the sliding stage of the tested vehicle 1 in a state that the tested vehicle 1 loses the pushing acceleration of the small vehicle 3. During the process of the tested vehicle 1 sliding freely on the track 2, due to the interference caused by factors such as wind resistance and friction, velocity reduction may inevitably occur. Under the condition of the laboratory level requirement with the purpose of accurately controlling velocity, a small amount of velocity reduction may inevitably cause interference to the tested result. Therefore the arrangement of the sliding section with a certain slope allows the tested vehicle 1 to overcome resistances such as wind resistance and friction from the track 2 by utilizing its own gravity component, and to maintain the velocity in the freely sliding process to be constant, thus ensuring the accuracy of the velocity control.

Further, the slope of the sliding section is configured to range from 2 degrees to 10 degrees.

In another embodiment, based on the above embodiments, a brake mechanism is additionally provided at a lateral side of the brake motor. After a resting time point of the connecting rope 8, the connecting rope 8 starts to generate the reverse inertial movement by the operation of the brake motor 6. At the rest time point, the brake mechanism at the lateral side of the brake motor 6 locks the brake motor 6. The brake motor 6 is locked by the brake mechanism while the brake motor 6 is de-energized, thus preventing the brake motor 6 from reversely pulling after stopping the inertial movement of the system. The brake mechanism at the lateral side of the brake motor 6 may be embodied as a hydraulic contracting brake. When the brake motor 6 finishes stopping the inertial movement of the connecting rope 8, the contracting brake has a braking effect to the reverse inertial movement of an output shaft of the brake motor 6, thus preventing the reverse rotation of the brake motor 6 from occurring, and preventing the reverse inertial movement from exceeding proper limits.

A rail vehicle collision test method is described according to an embodiment, which includes the following steps 10 to 40.

In step 10, a tested vehicle 1 and a small vehicle 3 are arranged at a test starting position on a track 2, and the small vehicle 3 is adjusted to be located at the rear of the tested vehicle 1 and be in contact with the tested vehicle 1 and abut against the tested vehicle 1.

In step 20, a drive motor 4 is started to drive the small vehicle 3 to perform an accelerated movement, and the small vehicle 3 pushes the tested vehicle 1 to perform an accelerated movement.

In step 30, a velocity of the tested vehicle 1 is detected, and when it is detected that the velocity of the tested vehicle 1 reaches a preset velocity, immediately entering step 40.

In step 40, the drive motor 4 is stopped, and meanwhile a brake motor 6 is started to brake the small vehicle 3.

In this method, by detecting the velocity of the tested vehicle 1, and further automatically controlling the drive motor 4 to stop, and meanwhile controlling the brake motor 6 to start, automatic detecting and controlling to the accelerating process of the tested vehicle 1 in the test process are achieved, and the arrangement of two motors improves the accuracy in controlling driving and acceleration and the stopping of the driving and acceleration. Compared with manually operating a real locomotive as a driving and accelerating device in the conventional technology which brings the drawbacks of manual operation lag and a low sensitivity of a locomotive system, the rail vehicle collision test method according to the present application significantly improves the accuracy in velocity control of the tested vehicle 1.

Based on the above rail vehicle collision test method, in another embodiment, the following steps 100 to 120 are further included after step 20 and before step 40.

In step 100, it is determined whether a real time state of the present test is normal, if it is determined that the real time state of present test is normal, entering step 110, and if it is determined that the real time state of present test is not normal, entering step 120.

In step 110, the small vehicle 3 is disconnected from the tested vehicle 1 by separating of a controlled separating device 9, and the process enters step 40.

In step 120, the connection of the small vehicle 3 to the tested vehicle 1 is maintained by the controlled separating device 9, and the process enters step 40.

The test state determining function additionally provided can determine whether to separate the small vehicle 3 from the tested vehicle 1 based on the result of monitoring whether the test is normal or not at an initial stage of the test, i.e., at an accelerating stage of the tested vehicle 1. The additional arrangement of the process for determining and controlling the separation, maintains the connection of the small vehicle 3 to the tested vehicle 1 if the present test needs to be canceled for some reasons at the accelerating stage of the tested vehicle 1, and further brakes the small vehicle 3, thus achieving the braking of the tested vehicle 1 at the same time. Thus may reduce wear and tear of the tested vehicle 1, and save the test cost. Correspondingly, in the case that the test process is smooth, when a predetermined velocity of the tested vehicle 1 is reached, the small vehicle 3 is separated from the tested vehicle 1, and the small vehicle 3 is braked separately, thus completing the present test.

The embodiments of the present application are for illustrating and describing the present application, and are not exhaustive or to limit the present application to the disclosed forms. Many modifications and variations are apparent for those ordinary skilled in the art. Selection and description of the embodiments are for better explaining the principle and practical applications of the present application, and enabling those ordinary skilled in the art to understand the present application and thereby designing various embodiments with various modifications adapted to particular usages.

The invention claimed is:

1. A rail vehicle collision test rig, used for collision tests on a tested vehicle, wherein the rail vehicle collision test rig comprises:

a track configured to support and guide the tested vehicle;

a small vehicle configured to push the tested vehicle, wherein the small vehicle is arranged on the track;

a drive motor configured to drive the small vehicle to move forward, wherein the drive motor is arranged at a first end of the track;

a first rotating hub, wherein the first rotating hub is arranged at the first end of the track and is connected to the drive motor;

a brake motor configured to brake the small vehicle, wherein the brake motor is arranged at a second end of the track;

a second rotating hub, wherein the second rotating hub is arranged at the second end of the track and is connected to the brake motor;

a connecting rope, wherein the connecting rope is wound on the first rotating hub and the second rotating hub, and the small vehicle is connected to the connecting rope at a portion between the first rotating hub and the second rotating hub;

a detector configured to detect a velocity and a position of the tested vehicle in real time; and a controller, which is connected to the detector and allowed to communicate with the detector, and is configured to control the drive motor and the brake motor to operate or stop operating; and wherein, in a first state, the small vehicle is located at the rear of the tested vehicle and is in contact with the tested vehicle and abuts against the tested vehicle, and the controller is configured to control the drive motor to drive the small vehicle to push the tested vehicle to perform an accelerated movement; and in a second state, when a velocity, detected by the detector, of the tested vehicle being pushed by the small vehicle reaches a preset velocity, the controller is configured to stop the drive motor and start the brake motor to brake the small vehicle to disengage the small vehicle from the tested vehicle.

2. The rail vehicle collision test rig according to claim 1, further comprising a fixed seat fixed to the tested vehicle, wherein the fixed seat is provided with a locking pin hole and a base which is fixed to the small vehicle, wherein a locking pin which is embeddable into or disengageable from the locking pin hole, and a locking pin motor configured to drive the locking pin are provided on the base.

3. The rail vehicle collision test rig according to claim 2, wherein the track comprises an accelerating section, and the accelerating section has an accelerating start end which is higher than an accelerating terminal end of the accelerating section.

4. The rail vehicle collision test rig according to claim 3, wherein taking the accelerating terminal end as a base point, an upward inclination angle of the accelerating section in a horizontal direction ranges from 10 degrees to 30 degrees.

5. The rail vehicle collision test rig according to claim 4, further comprising a protection stopper configured to limit movements of the tested vehicle, wherein the protection stopper is arranged at the accelerating start end.

6. The rail vehicle collision test rig according to claim 3, wherein the track comprises a sliding section; a sliding start end of the sliding section is coincident with the accelerating terminal end, and the sliding start end is higher than a sliding terminal end of the sliding section.

7. The rail vehicle collision test rig according to claim 6, wherein taking the sliding terminal end as a base point, an upward inclination angle of the sliding section in a horizontal direction ranges from 2 degrees to 10 degrees.

8. The rail vehicle collision test rig according to claim 1, further comprising a brake mechanism configured to stop the rotation of the brake motor, wherein the brake mechanism is arranged at a lateral side of the brake motor.

9. The rail vehicle collision test rig according to claim 4, wherein the track comprises a sliding section; a sliding start end of the sliding section is coincident with the accelerating terminal end, and the sliding start end is higher than a sliding terminal end of the sliding section.

10. The rail vehicle collision test rig according to claim 5, wherein the track comprises a sliding section; a sliding start end of the sliding section is coincident with the accelerating terminal end, and the sliding start end is higher than a sliding terminal end of the sliding section.

11. A rail vehicle collision test method, comprising:

in a first step, arranging a tested vehicle and a small vehicle to locate at a test starting position on a track, and adjusting the small vehicle to locate at the rear of the tested vehicle and be in contact with the tested vehicle and abut against the tested vehicle;

in a second step after the first step, starting a drive motor to drive the small vehicle to perform an accelerated movement, and pushing the tested vehicle by the small vehicle to perform an accelerated movement;

in a third step after the second step, detecting a velocity of the tested vehicle, and immediately entering a fourth step when the velocity of the tested vehicle reaches a preset velocity; and in the fourth step after the third step, stopping the drive motor, and meanwhile starting a brake motor to brake the small vehicle to disengage the small vehicle from the tested vehicle.

12. The rail vehicle collision test method according to claim 11, after the second step and before the fourth step, further comprising:

determining whether the real time state of present test is normal, and if it is determined that the real time state of present test is normal, disconnecting the small vehicle from the tested vehicle by separating of the controlled separating device, and entering the fourth step; and if it is determined that the real time state of present test is abnormal, maintaining the small vehicle to be in connection with the tested vehicle by the controlled separating device, and entering the fourth step.

* * * * *